US012211405B2

(12) United States Patent
Xiong

(10) Patent No.: US 12,211,405 B2
(45) Date of Patent: Jan. 28, 2025

(54) DISPLAY DEVICE, CONTROL METHOD THEREOF AND DISPLAY EQUIPMENT

(71) Applicant: WUHAN CHINA STAR OPTOELECTRONICS TECHNOLOGY CO., LTD., Hubei (CN)

(72) Inventor: Rui Xiong, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/561,191

(22) PCT Filed: Jun. 28, 2023

(86) PCT No.: PCT/CN2023/103202
§ 371 (c)(1),
(2) Date: Nov. 15, 2023

(87) PCT Pub. No.: WO2024/234449
PCT Pub. Date: Nov. 21, 2024

(65) Prior Publication Data
US 2024/0386816 A1 Nov. 21, 2024

(30) Foreign Application Priority Data
May 16, 2023 (CN) ........................ 202310553359.0

(51) Int. Cl.
*G09G 3/00* (2006.01)

(52) U.S. Cl.
CPC ..... *G09G 3/001* (2013.01); *G09G 2310/0202* (2013.01); *G09G 2330/021* (2013.01)

(58) Field of Classification Search
None
See application file for complete search history.

(56) References Cited

U.S. PATENT DOCUMENTS 11,227,560 B2 * 1/2022 Chen ...................... G09G 3/003
2015/0109270 A1 * 4/2015 Ito ........................ G09G 3/3607
345/207

* cited by examiner

*Primary Examiner* — Nicholas J Lee
(74) *Attorney, Agent, or Firm* — HSML P. C.

(57) ABSTRACT

The present disclosure provides a display device, a method for controlling the display device, and a display apparatus. The display device includes a plurality of source signal output terminals, a plurality of data lines, a plurality of scan lines, a pixel unit array, and a switching module. When the display device displays a three-dimensional picture, a source signal output terminal provides a data signal to only one sub-pixel. When the display device displays a two-dimensional picture, a source signal output terminal simultaneously provides data signals to two rows and columns of four sub-pixels of the same luminous color.

18 Claims, 7 Drawing Sheets

DISPLAY DEVICE, CONTROL METHOD THEREOF AND DISPLAY EQUIPMENT

CROSS REFERENCE TO RELATED ART

This application is a US national phase application based upon an International Application No. PCT/CN2023/103202, filed on Jun. 28, 2023, which claims the priority of Chinese Patent Application No. 202310553359.0, entitled "DISPLAY DEVICE, CONTROL METHOD THEREOF AND DISPLAY EQUIPMENT," filed on May 16, 2023, the disclosures of which are incorporated herein by reference in its entirety.

FIELD OF DISCLOSURE

The present disclosure relates to a display technology, and more particularly, to a display device, a control method thereof and display equipment.

BACKGROUND

On the one hand, the naked-eye three dimension (3D) technology allows users to see images with 3D display effects with their naked eyes and has application prospects in notebooks, vehicle displays and other fields. As shown in (a) in FIG. 1, with the slit grating technology, the right eye could see an image corresponding to right (R) and the left eye could see an image corresponding to left (L). The right and left images form a 2-view point image, which is synthesized by the brain to obtain a 3D image. Theoretically, since the left and right eyes respectively recognize the images of odd and even columns of the display panel, the pixels per inch (PPI) of the 3D image is only about half of the actual PPI of the display panel. Therefore, in order to achieve mainstream resolution, 3D display panels require higher PPI, resulting in high power consumption.

On the other hand, 3D to 2D display effect switching technology is conducive to expanding the application range of naked-eye 3D displays. For example, with the same computer, the user can use the naked-eye 3D displays to watch movies and play games, but the user could switch to use 2D displays to work or read e-books because the 2D displays introduce lower eye fatigue. The 2D display is shown in FIG. 1(*b*). However, by turning off the slit grating (making the grating transparent), although the switching between 3D and 2D display screens can be achieved, the power consumption of the panel will not be reduced, and the image resolution will suddenly change, causing discomfort to the human eye.

SUMMARY

One objective of an embodiment of the present disclosure is to provide a display device, a control method thereof and a display equipment. which can make the two-dimensional picture and the three-dimensional picture maintain similar resolution when switching between the two-dimensional picture and the three-dimensional picture, and can reduce the logic power consumption when the display device displays the two-dimensional picture.

Technical Solutions

According to a first aspect of the present disclosure, a display device comprises:

a plurality of source signal output terminals, electrically connected to a source driver, configured to transmit a data signal provided by the source driver;

a plurality of data lines, electrically connected to the plurality of source signal output terminal, configured to transmit the data signal;

a plurality of scan lines, electrically connected to a gate driver, configured to transmit a scan signal provided by the gate driver;

a pixel unit array, wherein each pixel unit includes a plurality of sub-pixels, a color resistance of sub-pixels in a same column is identical, a color resistance of sub-pixels of adjacent columns are different, sub-pixels of a same column are electrically connected with an identical data line, sub-pixels of a same row are electrically connected with an identical scan line, and an on-off status between the data line and pixel electrodes of the sub-pixels are controlled by the scan lines to control a luminance of the sub-pixels; and a switching module, electrically connecting the source signal output terminals and the data lines, configured to control the on-off status between the source signal output terminals and the data lines;

wherein when the display device displays a three-dimensional picture, the scan lines are turned on line by line, and each scan line is turned on for a set time period T; during a turning-on period, the switching module controls a source signal output terminal to be electrically connected with a data line; and T is a positive integer;

wherein when the display device displays a two-dimensional picture, the scan lines are turned on two lines by two lines, and each scan line is turned on for a set time period 2T; during a turning-on period, the switching module controls a source signal output terminal to be electrically connected with two target data lines; and the target data lines are two data lines connected to two columns of sub-pixels with the same luminous color.

According to an optional embodiment of the present disclosure, the pixel unit array includes odd column pixel units and even column pixel units, the odd column pixel units and the even column pixel units are arranged sequentially along the scan line direction; the plurality of source signal output terminals comprise an odd column source signal output terminal group and an even column source signal output terminal group, and the odd column source signal output terminal group and the even column source signal output terminal group are arranged sequentially along the scan line direction; and the switching module comprises:

a first switching control line, electrically connected to a switching controller, configured to provide a first switching control signal; and a plurality of first switches, a first end of the first switch is electrically connected to a first switching control line, a second end of the first switch is electrically connected to one of the data lines, and the plurality of the first switches are respectively electrically connected to the plurality of source signal output terminals;

wherein the first switching control line turns on or off the first switch to control a plurality of odd column signal output terminals of the odd column source signal output terminal group to provide or disconnect the source signal respectively to sub-pixels in the odd column pixel unit, and to control a plurality of even column signal output terminals of the even column source signal output terminal group to provide or disconnect the source signal respectively to sub-pixels in the odd column pixel unit.

According to an optional embodiment of the present disclosure, the switching module further comprises:

a second switching control line, electrically connected to the switching controller, configured to provide a second switching control signal;

a plurality of second switches, wherein a first end of the second switch is electrically connected to the second switching control line, a second end of the second switch is electrically connected to one of the data lines, third ends of each two target second switches are electrically connected to a same source signal output terminal in the target source signal end group, and one of the source signal output terminals is connected to the third ends of only two of the second switches, and the two target second switches are the two second switch switches connected to two of the target data lines, respectively;

wherein the second switching control line turns on or off the second switch to control one of the source signal output terminals in the target source signal end group to simultaneously provide or disconnect the source signal to sub-pixels in a target odd column pixel unit and sub-pixels in a target even column pixel unit; the target source signal end group is the odd column source signal output terminal group or the even column source signal output terminal group; and the target odd column pixel unit and the target even column pixel unit are an odd column pixel unit and an even column pixel unit of the adjacent columns in the pixel unit array.

According to an optional embodiment of the present disclosure, the first switch and the second switch are implemented with any one of or a combination of a thin-film transistor, a T-channel metal oxide semiconductor field effect transistor (MOSFET), a P-channel MOSFET, and a complementary MOSFET.

According to an optional embodiment of the present disclosure, the display device further comprises: a transistor unit, wherein each of transistor unit is electrically connected to one of the data lines, one of the scan lines and a pixel electrode of the sub-pixel, respectively and is configured to control the data signal to be inputted into the pixel electrode under a control of the scan signal.

According to an optional embodiment of the present disclosure, the display device is a naked-eye three-dimensional display device.

According to a second aspect of the present disclosure, a method for controlling a display device is disclosed. The method is applied to the display device. The display device comprises a plurality of source signal output terminals, a plurality of data lines, a plurality of scan lines, a plurality of sub-pixels and switching modules arranged in an array.

The method comprises: when the display device displays a three-dimensional picture, the scan lines are turned on line by line, and each scan line is turned on for a set time period T; during a turning-on period, utilizing the switching module to control a source signal output terminal to be electrically connected with one of the data lines; and T is a positive integer;

when the display device displays a two-dimensional picture, the scan lines are turned on two lines by two lines, and each scan line is turned on for a set time period 2T; during a turning-on period, utilizing the switching module to control a source signal output terminal to be electrically connected with two target data lines; and the target data lines are two data lines connected to two columns of sub-pixels with the same luminous color.

According to an optional embodiment of the present disclosure, the display device adopts the display device as provided in the first aspect of the present disclosure. The step of utilizing the switching module to control a source signal output terminal to be electrically connected with one of the data lines when the display device displays a three-dimensional picture comprises:

when the display device displays a three-dimensional picture, utilizing the first switching control line to output a high voltage level to turn on the first switch and utilizing the second switching control line to output a low voltage level to turn off the second switch.

According to an optional embodiment of the present disclosure, when the display device displays a two-dimensional picture, the step of utilizing the switching module to control a source signal output terminal to be electrically connected with two target data lines comprises:

when the display device displays a two-dimensional picture, utilizing the first switching control line to output a low voltage level to turn off the first switch and utilizing the second switching control line to output a high voltage level to turn on the second switch.

According to a third aspect of the present disclosure, the display apparatus includes the display device as provided in the first aspect of the present disclosure, or perform the method for controlling the display device as provided in the first aspect of the present disclosure.

Advantageous Effect

The present disclosure could use the switching module to control the connection/disconnection between the source signal output terminal and the data line. When the display device displays a three-dimensional picture, the scan lines are turned on line by line, and each scan line is turned on for a set time period T. During a turning-on period, the switching module is utilized to control a source signal output terminal to be electrically connected with one of the data lines, so that a source signal output terminal provides a data signal to only one sub-pixel. When the display device displays a two-dimensional picture, the scan lines are turned on two lines by two lines, and each scan line is turned on for a set time period 2T. During a turning-on period, the switching module is utilized to control a source signal output terminal to be electrically connected with two target data lines, so that a source signal output terminal simultaneously provides data signals to two rows and columns of four sub-pixels of the same luminous color. When the display device display two-dimensional picture, the two-dimensional picture display control mode allows the bias frequency to be half of the bias frequency when the display device displays the three-dimensional picture, thereby effectively reducing the power consumption when the display device switches to display the two-dimensional picture. When the display device display two-dimensional picture, the two-dimensional picture display control mode also allows the overall resolution of the row direction or column direction to be half of the overall resolution of the display device when displaying the three-dimensional picture. Because the PPI of the display device displaying the three-dimensional picture is half of the actual PPI of the display device, the resolution of the display device displaying the three-dimensional picture and the resolution when displaying the two-dimensional picture are relatively close, so as to solve the problem of inconsistent resolution between the switch from displaying a three-dimensional picture to a two-dimensional picture.

DETAILED DESCRIPTION OF PREFERRED EMBODIMENTS

In order to make the purpose, technical solution and effect of the present disclosure clearer and clearer, the present disclosure will be further described in detail below with reference to the accompanying drawings and examples. It should be understood that the specific embodiments described here are only used to explain the present disclosure and are not used to limit the present disclosure.

Embodiments of the present disclosure provide a display device, a control method for the display device, and a display device, which are described in detail below.

Figure 1:
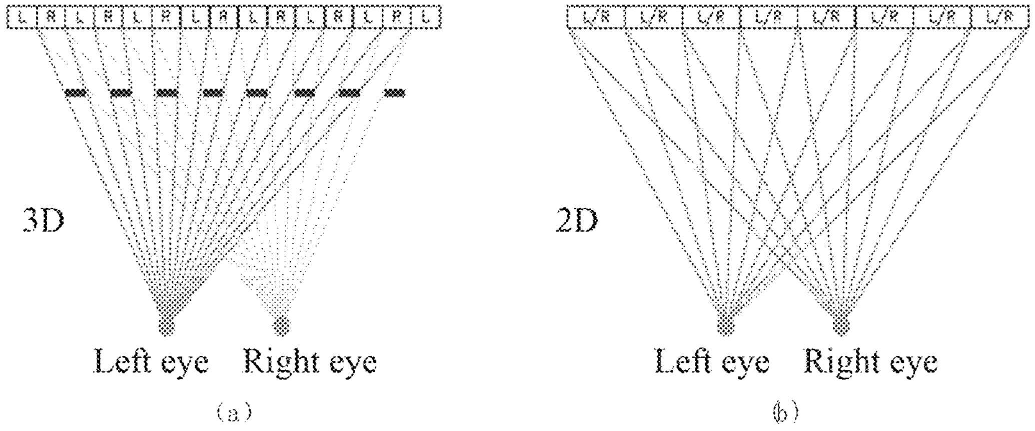
FIG. 1 is a diagram showing the technology of switching from two-dimensional display to a 3D display according to the conventional art.
Figure 2:
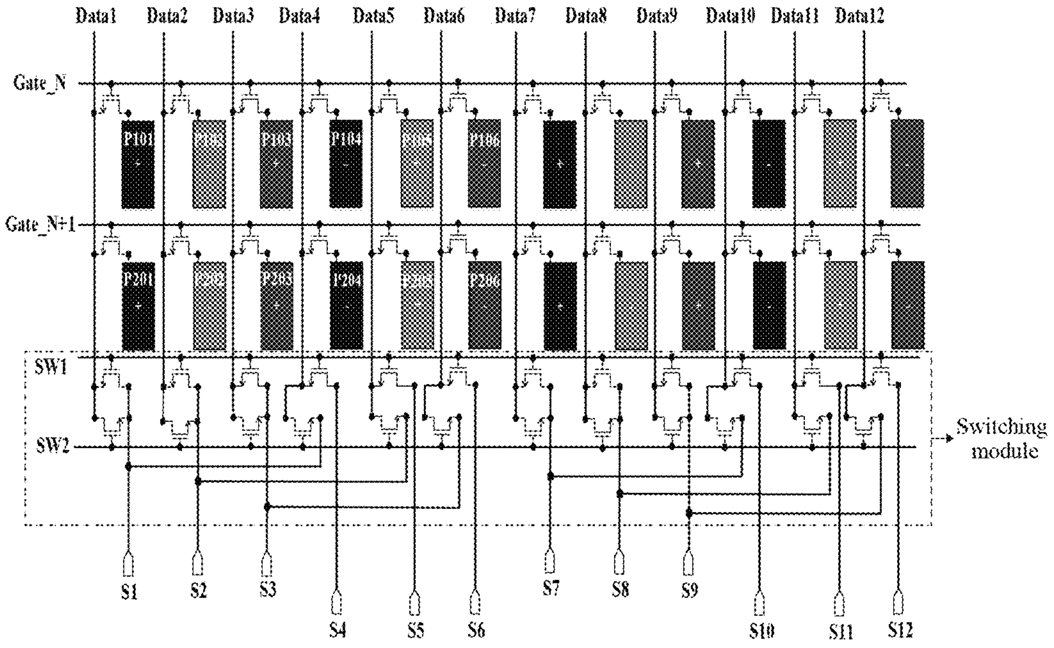
FIG. 2 is a diagram of a conventional display device.

Please refer to FIG. 2. FIG. 2 is a diagram of a conventional display device. Taking a liquid crystal display (LCD) as an example, the display device includes at least a plurality of source signal output terminals, a plurality of data lines, a plurality of scan lines, a pixel unit array and a switching module. Please note, the source signal output terminal, the data lines, the scan lines, and the pixel unit array shown in FIG. 2 are only a part of the display device as an example, not a limitation of the present disclosure.

The plurality of source signal output terminals are electrically connected to a source driver, and configured to transmit a data signal provided by the source driver.

Specifically, ss shown in FIG. 2, the source signal output terminals are specifically the pins of the source driver (not shown in the figure), and the source signal output terminals include the source signal output terminal S1, the source signal output terminal S2, . . . , source signal output terminal S12. Here, the plurality of source signal output terminals includes an odd column source signal output group and an even column source signal output group, and the odd column source signal output group and the even column source signal output group arranged alternatively, and the number of source signal output terminals contained in the odd column source signal output group is the same as the number of source signal output terminals contained in the even column source signal output group. In this embodiment, the number of source signal output terminals contained in the odd column source signal output group/the even column source signal output group corresponds to the number of sub-pixels contained in each pixel unit (see below). For example, as shown in FIG. 2, each pixel unit comprises 3 sub-pixels. Correspondingly, the number of the source signal output terminals contained in the odd column source signal output group/the even column source signal output group is also 3.

For example, the source signal output terminal S1, the source signal output terminal S2 and the source signal output terminal S3 are used as an odd column source signal output terminal group; the source signal output terminal S4, the source signal output terminal S5 and the source signal output terminal S6 are used as an even column source signal output terminal group; the source signal output terminal S7, the source signal output terminal S8 and the source signal output terminal S9 are used as an odd column source signal output terminal group; and the source signal output terminal S10, source signal output terminal S11 and source signal output terminal S12 are used as an even column source signal output terminal group. Please note, this arrangement should be regarded as an example, not a limitation of the present disclosure. In this embodiment, the arrangement of the odd column source signal output terminal groups/the even column source signal output terminal groups, and the number of source signal output terminals included in these groups are not limited.

The plurality of data lines are electrically connected to the plurality of source signal output terminal, and configured to transmit the data signal.

Specifically, as shown in FIG. 2, the plurality of data lines include a data line Data1, a data line Data2, a data line Data3, . . . , and a data line Data12 arranged in order. The data line Data1, the data line Data2, the data line Data3, . . . , the data line Data12 are electrically connected to the source signal output terminal S1, source signal output terminal S2, . . . , and the source signal output terminal S12 through the switching module (as described below). The actual connections between the data lines and the source signal output terminals will be illustrated in the following disclosure.

The plurality of scan lines are electrically connected to a gate driver, and configured to transmit a scan signal provided by the gate driver.

Specifically, as shown in FIG. 2, the plurality of scan lines include a scan line Gata_N, a scan line Gata_N+1, a scan line Gata_N+2 (not shown), a scan line Gata_N+3 (not shown), . . . , a scan line Gata_N and a scan line Gata_N+1 arranged in order. These scan lines are electrically connected to the gate driver (not shown), and the direction of transmission of the scan signal is from the scan line Gata_N to the scan line Gata_N+1. And the scan line Gata_N and the scan line Gata_N+1 are used to transmit the scan signal provided by the gate driver.

The plurality of sub-pixels are arranged in an array. The sub-pixels in the same column have the same color resistance. The sub-pixels in adjacent columns have different color resistances. The sub-pixels in the same column are electrically connected with the same data line. The sub-pixels in the same row are electrically connected with the same scan line. Through the scan lines, the electrical connection between the data lines and the pixel electrodes of the sub-pixels are controlled such that the sub-pixels are controlled to emit lights.

Each pixel unit comprises a plurality of sub-pixels. The pixel unit array comprises odd column pixel units and even column pixel units. The odd column pixel units and even column pixel units are arranged alternatively in the direction of the scan line. For example, as shown in FIG. 2, the pixel unit array specifically includes a sub-pixel P101, a sub-pixel P102, . . . , and a sub-pixel P106 in the same row and a sub-pixel P201, a sub-pixel P202, . . . , and a sub-pixel P206 in the same row. The color resistance of sub-pixels in the same column is the same, and the color resistances of sub-pixels in adjacent columns are different.

The sub-pixel P101, the sub-pixel P102 and the sub-pixel P103 together constitute an odd column pixel unit and respectively correspond to three sub-pixels, a red sub-pixel (R), a green sub-pixel (G), and a blue sub-pixel (B), of the pixel unit. Similarly, the sub-pixel P201, the sub-pixel P202 and the sub-pixel P203 together constitute an even column pixel unit and respectively correspond to the R, G, B sub-pixels. The sub-pixel P101 and the sub-pixel P102 have different color resistances, and the sub-pixel P101 and the sub-pixel P201 have the same color resistance.

In this embodiment, specifically, the display device further comprises transistors. Each transistor is electrically connected to a data line, a scan line and a pixel electrode of a sub-pixel. The transistor is used to output the data signal to the pixel electrode under the control of the scan signal.

In this embodiment, the transistors include are implemented with any one of or a combination of a thin-film transistor (TFT), a T-channel metal oxide semiconductor field effect transistor (MOSFET), a P-channel MOSFET, and a complementary MOSFET.

In the following disclosure, the transistors are implemented with TFTs as an example. As shown in FIG. 2, the gate of a transistor unit is electrically connected to the scan line Gata_N, the drain of the transistor unit is electrically connected to the data line Data1, and the source of the transistor unit is electrically connected to the pixel electrode of the sub-pixel P101. The connection between the data line Data1 and the pixel electrode of the sub-pixel P101 is controlled by the scan line Gata_N. When the scan signal of the scan line Gata_N is high, the pixel electrode and the data line Data1 and the sub-pixel P101 is connected. At this time, the data signal (rotation voltage) is provided to the pixel electrode of the sub-pixel P101 through the data line Data1, and thus the sub-pixel P101 emits light.

The switching module is electrically connecting the source signal output terminals and the data lines, and configured to control the on-off status between the source signal output terminals and the data lines.

In this embodiment of the present disclosure, the switching module specifically comprises a first switching control line and a plurality of first switches.

The first switching control line is electrically connected to a switching controller, configured to provide a first switching control signal.

A first end of the first switch is electrically connected to a first switching control line, and a second end of the first switch is electrically connected to one of the data lines. The plurality of the first switches are respectively electrically connected to the plurality of source signal output terminals.

The first switching control line turns on or off the first switch to control a plurality of odd column signal output terminals of the odd column source signal output terminal group to provide or disconnect the source signal respectively to sub-pixels in the odd column pixel unit, and to control a plurality of even column signal output terminals of the even column source signal output terminal group to provide or disconnect the source signal respectively to sub-pixels in the odd column pixel unit.

Figure 3:
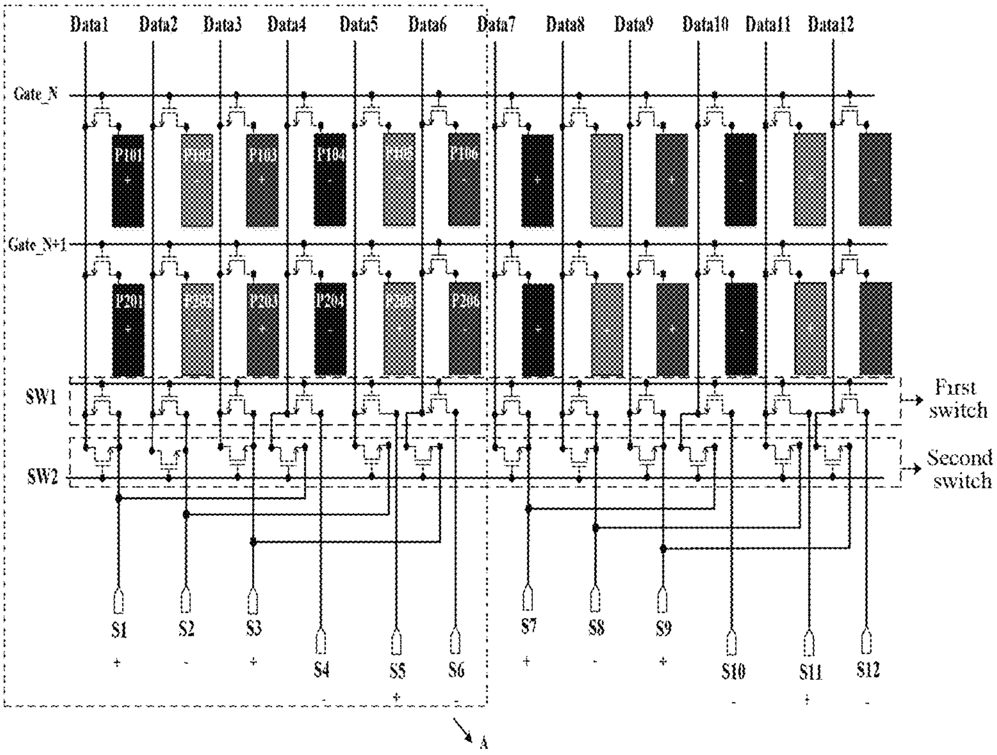
FIG. 3 is a diagram of a display device according to an embodiment of the present disclosure.
Figure 4:
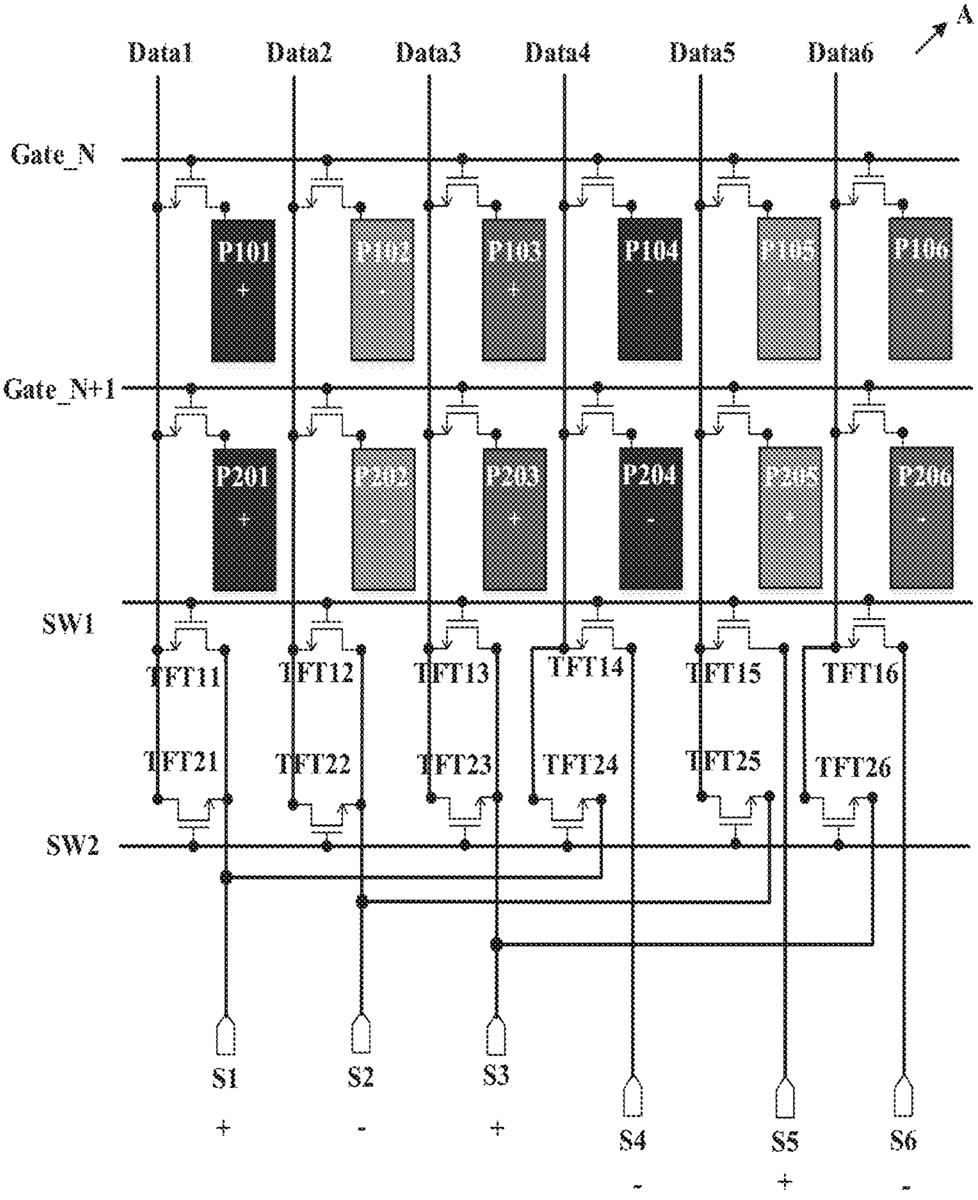
FIG. 4 is a diagram of a display device according to another embodiment of the present disclosure.

Please refer to FIGS. 2-4. In this embodiment, the first switching control line is the first switching control line SW1 and the first switch includes a first switch TFT11, a first switch TFT12, . . . , first switch TFT16.

The gate of the first switch TFT11, the gate of the first switch TFT12, . . . , and the gates of the first switch TFT16 are electrically connected to the first switching control line SW1.

The drain of the first switch TFT11, the drain of the first switch TFT12, . . . , and the drain of the first switch TFT16 are respectively electrically connected to the data line Data1, the data line Data2, . . . , and the data line Data6.

The source of the first switch TFT11, the source of the first switch TFT12, . . . , and the source of the first switch TFT16 are respectively electrically connected to the source signal output terminal S1, the source signal output terminal S2, . . . , and the source signal output terminal S6.

In this embodiment, when the first switching control line SW1 inputs a high voltage level VGH, the first switch TFT11, the first switch TFT12, . . . , and the first switch TFT112 are turned on. At this time, the data line Data1 is connected to the source signal output terminal S1, and the data line Data2 is connected to the source signal output terminal S2, . . . , and the data line Data12 is connected to the source signal output S12. That is, at this time, the odd column source signal output terminals (S1, S2, S3) in the odd column source signal output terminal group provide the source signal to the sub-pixels (P101, P102, P103) in the odd column pixel units. Similarly, the even column source signal output terminals (S4, S5, S6) in the even column source signal output terminal group provide the source signal to the sub-pixels (P104, P105, P106) in the even column pixel units.

When the first switching control line SW1 inputs a low voltage level VGL, the first switch TFT11, the first switch TFT12, . . . , and the first switch TFT112 are turned off. At this time, the data line Data1 and the source signal output S1 are disconnected, the data line Data2 and the source signal output S2 are disconnected, . . . , and the data line Data12 and the source signal output S12 are disconnected. That is, at this time, the odd column source signal output terminals (S1, S2, S3) in the odd column source signal output group are disconnected and cannot provide the source signal to the sub-pixels (P101, P102, P103) in the odd column pixel units. Similarly, the even column source signal output terminals (S4, S5, S6) in the even column source signal output group are disconnected and cannot provide the source signal to the sub-pixels (P104, P105, P106) in the even column pixel units. The switching module further comprises a second switching control line and a plurality of second switches.

The second switching control line is electrically connected to the switching controller, configured to provide a second switching control signal.

A first end of the second switch is electrically connected to the second switching control line, a second end of the second switch is electrically connected to one of the data lines, third ends of each two target second switches are electrically connected to a same source signal output terminal in the target source signal end group, and one of the source signal output terminals is connected to the third ends of only two of the second switches. The two target second switches are the two second switch switches connected to two of the target data lines, respectively;

The second switching control line turns on or off the second switch to control one of the source signal output terminals in the target source signal end group to simultaneously provide or disconnect the source signal to sub-pixels in a target odd column pixel unit and sub-pixels in a target even column pixel unit; the target source signal end group is the odd column source signal output terminal group or the even column source signal output terminal group; and the target odd column pixel unit and the target even column pixel unit are an odd column pixel unit and an even column pixel unit of the adjacent columns in the pixel unit array.

Referring to FIGS. 2-4, in this embodiment, the second switching control line is the second switching control line SW2, and the second switch includes a second switch TFT21, a second switch TFT22, . . . , and a second switch TFT26. The gate of the second switch TFT21, the gate of the second switch TFT22, . . . , and the gate of the second switch TFT26 are electrically connected to the second switching control line SW2.

The source of the second switch TFT21, the source of the second switch TFT22, . . . , and the source of the second switch TFT26 are respectively electrically connected to the data line Data1, the data line Data2, . . . , and the data line Data6.

The drain of the second switch TFT21 and the drain of the second switch TFT24 are electrically connected with the source signal output terminal S1 in the target source signal end group at the same time; the drain of the second switch TFT22 and the drain of the second switch TFT25 are electrically connected with the source signal output terminal S2 in the target source signal end group at the same time; the drain of the second switch TFT23 and the drain of the second switch TFT26 are electrically connected with the source signal output terminal S3 in the target source signal end group at the same time. That is, in this embodiment, the target source signal end group is an odd column source signal output terminal group consisting of the source signal output terminal S1, the source signal output S2, and the source signal output S3. Please note, in this embodiment, the target source signal end group may also be an even column source signal output terminal group. The above example is not a limitation of the present disclosure.

Taking the display device shown in FIG. 4 as an example, when the second switching control line SW2 inputs a high voltage level VGH, the second switch TFT21, the second switch TFT22, . . . , and the second switch TFT26 are turned on. At this time, the data line Data1 and the data line Data4 are connected to the source signal output terminal S1; the data line Data2 and the data line Data5 are connected to the source signal output terminal S2, and the data line Data3 and the data line Data6 are connected to the source signal output S3.

At this moment, the odd column source signal output terminal S1 in the odd column signal output terminal group provides the source signal to the sub-pixel P101 in the odd column pixel unit and the sub-pixel P104 in the even column pixel unit; the odd column source signal output terminal S2 in the odd column signal output terminal group provides the source signal to the sub-pixel P102 in the odd column pixel unit and the sub-pixel P105 in the even column pixel unit; and the odd column source signal output terminal S3 in the odd column signal output terminal group provides the source signal to the sub-pixel P103 in the odd column pixel unit and the sub-pixel P106 in the even column pixel unit.

When the second switching control line SW2 input a low voltage level VGL, the second switch TFT21, the second switch TFT22, . . . , and the second switch TFT26 are turned off. At this time, the data line Data1 and the data line Data4 are disconnected to the source signal output S1; the data line Data2 and the data line Data5 are disconnected to the source signal output S2; and the data line Data3 and the data line Data6 are disconnected to the source signal output S3.

At this moment, the odd column source signal output terminals (S1, S2, S3) in the odd column signal output terminal group are simultaneously disconnected and cannot provide the source signal to the sub-pixels (P101, P102, P103) in the odd column pixel unit and the sub-pixels (P104, P105, P106) in the even column pixel unit.

In this embodiment, the first switch and the second switch could be implemented with any one of or a combination of a thin-film transistor, a T-channel metal oxide semiconductor field effect transistor (MOSFET), a P-channel MOSFET, and a complementary MOSFET.

When the display device displays a three-dimensional picture, the scan line is turned on line by line, and each scan line is turned on for a set time period T. During the turning-on period, the switching module controls a source signal output terminal to be electrically connected to a data line. Here, T is a positive integer.

Figure 5:
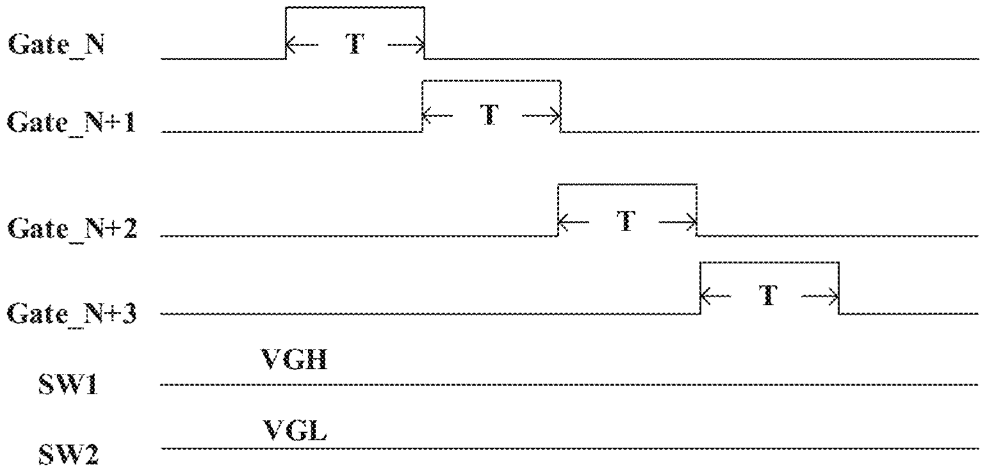
FIG. 5 is a diagram of a first driving timing according to an embodiment of the present disclosure.

When the display device displays a three-dimensional picture, the grating is turned on. When the human uses his naked eye to view the three-dimensional picture, the PPI of the three-dimensional picture is about half of the actual PPI of the display device. At this time, the first driving timing is used to drive the display device. The first drive timing can be as shown in FIG. 5. The scan lines are turned on line by line. Each scan line is turned on for a set time period T (Hus). That is, the turning-on time of each scan line is 1 Hus. During the turning-on time of each scan line, the first switching control line SW1 provides a high voltage level (VGH) and the second switching control line SW2 provides a low voltage level (VGL). That is, all the first switches (TFTT11~TFT112) are turned on, and all the second switches (TFT21~TFT212) are turned off. At this time, the source signal output terminals S1-S12 are respectively electrically connected to the data lines Data1-Data12. In other words, a source signal output terminal is connected to a data line, and a data line only provides a rotation voltage for one sub-pixel.

At this time, the logic power consumption when the display device displays the three-dimensional picture is: Power=$n*C_{data}*V_{swing}*f_1/2$, where Power is the logic power consumption, n is the number of data lines, $C_{data}$ is the parasitic capacitance between the data lines, $V_{swing}$ is the rotation voltage, $f_1$ is the bias frequency when the three-dimensional picture is displayed, $f_1=1/T$, T=Hus.

When the display device displays a two-dimensional picture, the scan lines are two lines by two lines, and each line is turned on for a period of time 2T. During the turning-on period, the switching module controls a source signal output terminal to be electrically connected to two target data lines at the same time. The two target data lines are two data lines connected to two columns of sub-pixels with the same luminous color.

In this embodiment, the sentence "the scan lines are two lines by two lines" may represent: in the first timing of the display device, the first line scan line and the second line scan line are turned on for the set time period 2T at the same time and the other scan lines are turned off; in the second timing of the display device, the first line scan line and the second line scan line are turned off, the third line scan line and the 4th line scan line are turned on at the same time for the set time period 2T, and so on. Please note, this is only an example, not a limitation of the present disclosure. This arrangement can also be adjusted according to the actual implementation.

Figure 6:
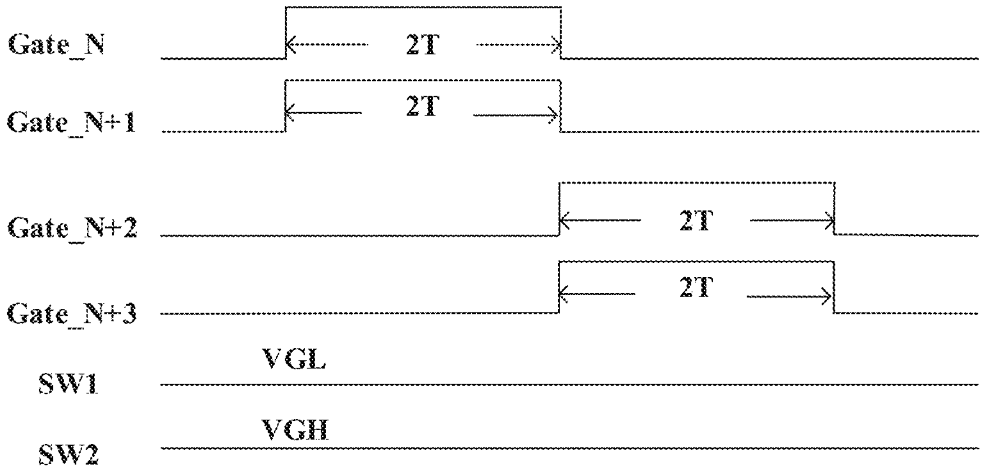
FIG. 6 is a diagram of a second driving timing according to an embodiment of the present disclosure.

Specifically, when the display device displays a two-dimensional picture, the grating is turned off. When the human uses his naked eye to view the two-dimensional picture, the resolution of the two-dimensional picture is equal to the actual resolution of the display device. At this time, the second driving timing is used to drive the display device. The second driving timing can be as shown in FIG. 6. The scan lines are turned on line by line and each line is turned on for a set time period 2T. That is, the turning-on time of each line is 2 Hus. During turning-on period of each line, the first switching control line SW1 provides a low voltage level (VGL), and the second switching control line SW2 provides a high voltage level (VGH). That is, all the first switches (TFT11~TFT112) are turned off and all the second switches (TFT21~TFT212) are turned on. At this time, the even column source signal output terminals (S4/S5/S6) and even column source signal output terminals (S10/S11/S12) in the even column source signal output terminal group are disconnected to the data lines by the first switches. Only all the odd column source signal output terminals in the odd column source signal output terminal group are connected to the data lines, specifically. The odd column source signal output terminal S1 in the odd column source signal output group is electrically connected with two target data lines (Data1 and Data4) at the same time; the odd column source signal output terminal S2 is electrically connected to two target data lines (Data2 and Data5); and the odd column source signal output group S3 is electrically connected to two target data lines (Data3 and Data6) at the same time. Here, the two target data lines are two data lines connected to two columns of sub-pixels with the same color resistance. Because the scan lines are turned on two lines by two lines, and the turning-on time of each line is 2 Hus. Therefore, at this time, an odd column source signal end outputs simultaneously provides the rotation voltage to 4 sub-pixels of the same color resistance.

Figure 7:
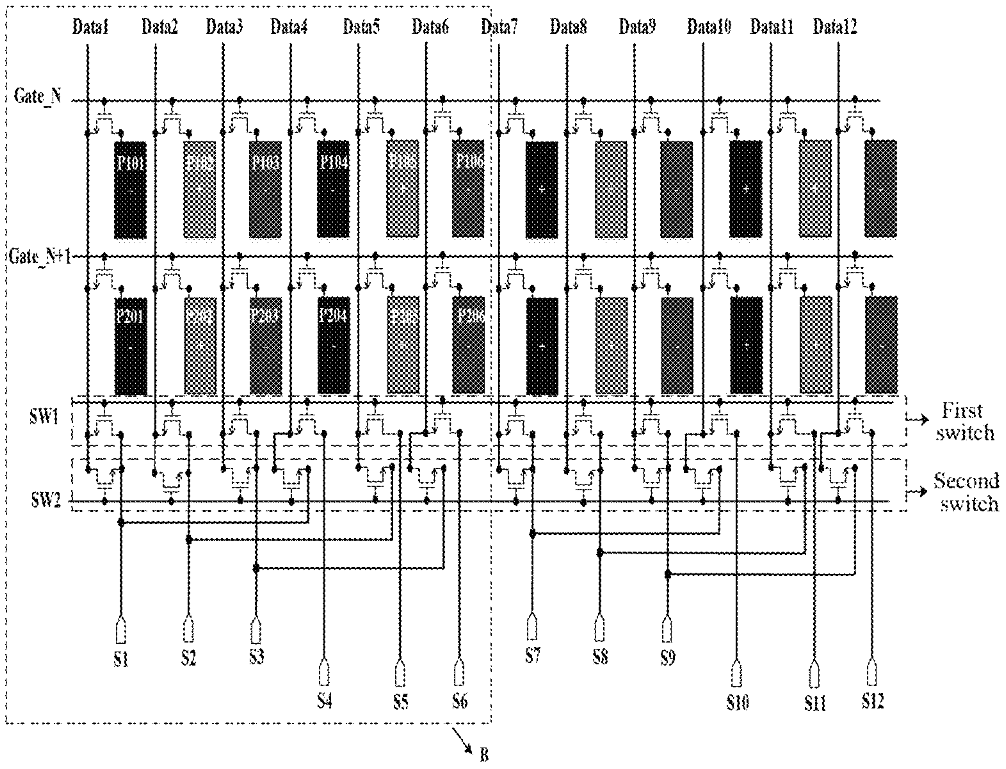
FIG. 7 is a diagram of a display device according to another embodiment of the present disclosure.
Figure 8:
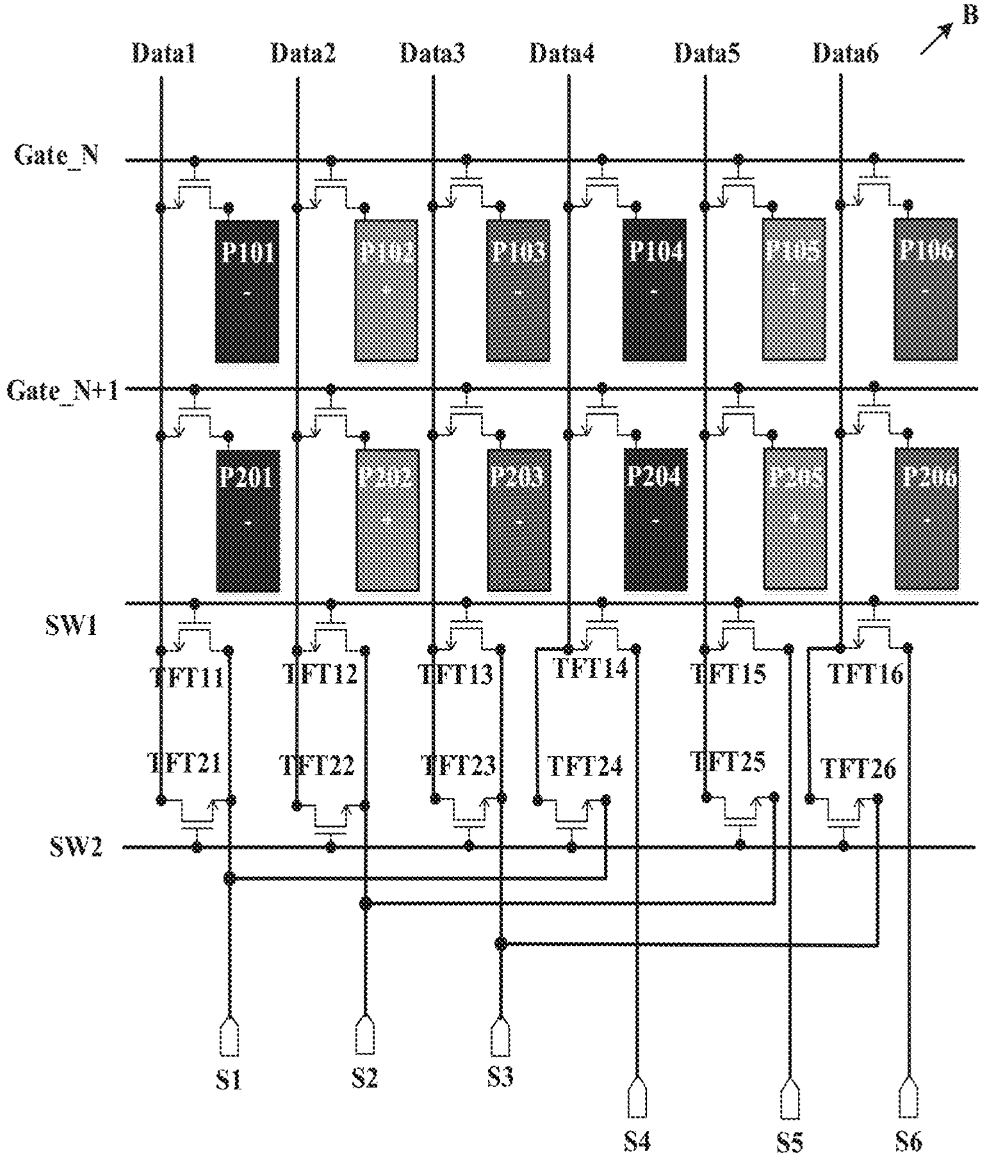
FIG. 8 is a diagram of a display device according to another embodiment of the present disclosure.

For example, as shown in FIGS. 7 and 8, when the scan lines Gata_N and Gata_N+1 are simultaneously turned on for the time period 2T, the odd column source output terminal S1 is electrically connected to the data lines Data1 and Data4 at the same time. The data lines Data1 and Data4 are connected to two columns of sub-pixels with the same color resistance, so that the odd column source output terminal S1 provides the rotation voltage to the sub-pixels P101, P201, P104 and P204 at the same time. At this time, the sub-pixel P101, P201, P104 and P204 have the same polarity.

At the same time, the logic power consumption when the display device displays a two-dimensional picture is: Power=$n*C_{data}*V_{swing}*f_2/(2*2)$, where Power is the logic power consumption, n is the number of data lines, $C_{data}$ is the parasitic capacitance between the data lines, $V_{swing}$ is the deflection voltage and $f_2$ is the bias frequency when a two-dimensional picture is displayed.

Therefore, the resolution of rows/columns of the display device in the second driving timing becomes half of the resolution of the display device in the first driving timing. However, because the PPI of the three-dimensional picture is about half of the actual PPI of the display device, the resolution of displaying the two-dimensional picture is similar to the resolution of displaying the three-dimensional picture. When the display device displays a two-dimensional non-solid color picture, the bias frequency of the display device is $f_2=1/T$. Here, T=2Hus, so $f_2=(½)f_1$. That is, the bias frequency when the display device is in the second driving timing is changed to half of that when the display device is in the first driving timing.

In some embodiments of the present disclosure, the display device comprises a naked-eye three-dimensional display device.

Since the resolution of the naked-eye three-dimensional display device is generally high, the data selector (multiplexer, MUX) cannot be used. That is, the display device in this embodiment can be adapted to the display device without a data selector.

In summary, the present disclosure adopts the above structure of the display device to implement the switch between the three-dimensional picture and the two-dimensional picture. When the display device switches to display a two-dimensional picture, it can maintain a resolution similar to that when a three-dimensional picture is disclosed. This improves the discomfort of human eyes. When the display device switches to display a two-dimensional picture, the logic power consumption is reduced. The present disclosure could be applied to the switch between the two-dimensional picture and three-dimensional picture, which is originally based on slit interference naked-eye three-dimensional display. In addition, the present disclosure could be also applied to a display device with no data selector. The applicability of the present disclosure is extensive.

Figure 9:
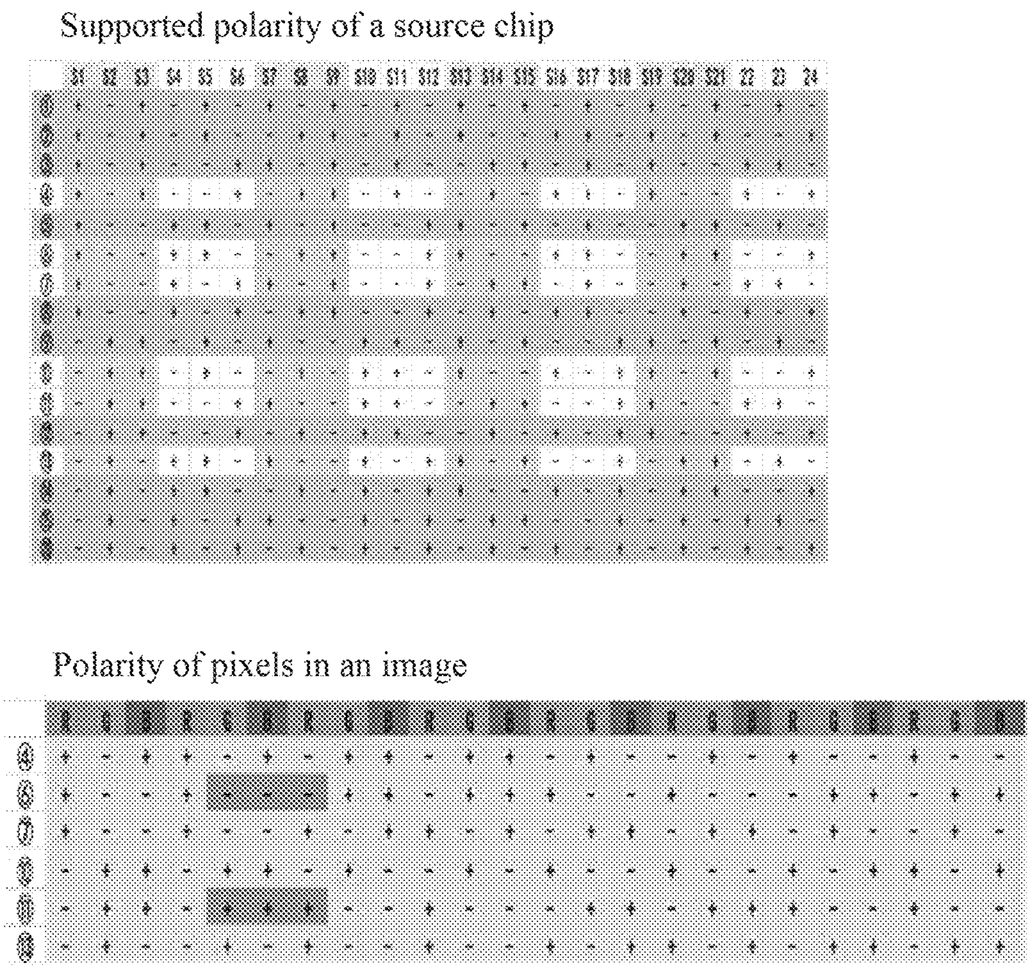
FIG. 9 is a diagram of a source polarity of the display device according to another embodiment of the present disclosure.

The technical solution proposed in the present disclosure could be implemented in a specific product. In this way, the display panel resolution of 8K/4K switching could be achieved with no need to include a chip that supports a conventional resolution switching. In the implemented product chip, the supported polarity of a source chip is shown in FIG. 9. Based on the supported polarity of the source chip shown in FIG. 9, by selecting a suitable polarity scheme, the pixels in the display panel also achieve column inversion. Therefore, the technical solution can not only alleviate the above-mentioned technical issues but also has strong applicability.

Figure 10:
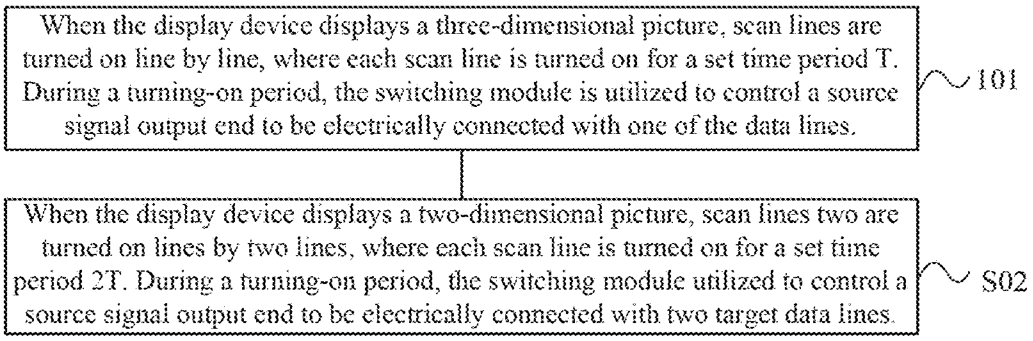
FIG. 10 is a flow chart of a control method of the display device according to another embodiment of the present disclosure.

According to an embodiment of the present disclosure, a control method of a display device is disclosed. Please refer to FIG. 10. FIG. 10 is a flow chart of a control method of the display device according to another embodiment of the present disclosure. Please note, although the steps are shown in a specific order, this order is not a limitation of the present disclosure. In some cases, the steps can be performed in a different order. The method comprises Step 101 and Step 102.

At step 101, when the display device displays a three-dimensional picture, the scan lines are turned on line by line. Each scan line is turned on for a set time period T. During a turning-on period, the switching module is utilized to control a source signal output terminal to be electrically connected with one of the data lines, where T is a positive integer.

In this embodiment, the step of utilizing the switching module to control a source signal output terminal to be electrically connected with one of the data lines comprises:

when the display device displays a three-dimensional picture, utilizing the first switching control line to output a high voltage level to turn on the first switch and utilizing the second switching control line to output a low voltage level to turn off the second switch.

At step 102, when the display device displays a two-dimensional picture, the scan lines two are turned on lines by two lines. Each scan line is turned on for a set time period 2T. During a turning-on period, the switching module utilized to control a source signal output terminal to be electrically connected with two target data lines. The target data lines are two data lines connected to two columns of sub-pixels with the same luminous color.

In this embodiment, the step of utilizing the switching module to control a source signal output terminal to be electrically connected with two target data lines comprises:

when the display device displays a two-dimensional picture, utilizing the first switching control line to output a low voltage level to turn off the first switch and utilizing the second switching control line to output a high voltage level to turn on the second switch.

The control principle of the display device can be found in the previous disclosure and further illustrations are omitted here for simplicity.

In some embodiments of the present application, the present application provides a display device. The display device includes the above-mentioned display device or a control method using the above-mentioned display device. Specifically, display equipment also includes middle frames, frame glue, etc. In this embodiment, the display device may be a display terminal such as a mobile phone, a tablet, or a television. This is only an example, and this application does not specifically limit the structure of the display device and the device type of the display device.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A display device, comprising:

a plurality of source signal output terminals, electrically connected to a source driver, configured to transmit a data signal provided by the source driver;

a plurality of data lines, electrically connected to the plurality of source signal output terminal, configured to transmit the data signal;

a plurality of scan lines, electrically connected to a gate driver, configured to transmit a scan signal provided by the gate driver;

a pixel unit array, wherein each pixel unit includes a plurality of sub-pixels, a color resistance of sub-pixels in a same column is identical, a color resistance of sub-pixels of adjacent columns are different, sub-pixels of a same column are electrically connected with an identical data line, sub-pixels of a same row are electrically connected with an identical scan line, and an on-off status between the data line and pixel electrodes of the sub-pixels are controlled by the scan lines to control a luminance of the sub-pixels; and a switching module, electrically connecting the source signal output terminals and the data lines, configured to control the on-off status between the source signal output terminals and the data lines;

wherein when the display device displays a three-dimensional picture, the scan lines are turned on line by line, and each scan line is turned on for a set time period T; during a turning-on period, the switching module controls a source signal output terminal to be electrically connected with a data line; and T is a positive integer;

wherein when the display device displays a two-dimensional picture, the scan lines are turned on two lines by two lines, and each scan line is turned on for a set time period 2T; during a turning-on period, the switching module controls a source signal output terminal to be electrically connected with two target data lines; and the target data lines are two data lines connected to two columns of sub-pixels with the same luminous color.

2. The display device of claim 1, wherein the pixel unit array includes odd column pixel units and even column pixel units, the odd column pixel units and the even column pixel units are arranged sequentially along the scan line direction; the plurality of source signal output terminals comprise an odd column source signal output terminal group and an even column source signal output terminal group, and the odd column source signal output terminal group and the even column source signal output terminal group are arranged sequentially along the scan line direction; and the switching module comprises:

a first switching control line, electrically connected to a switching controller, configured to provide a first switching control signal; and a plurality of first switches, a first end of the first switch is electrically connected to a first switching control line, a second end of the first switch is electrically connected to one of the data lines, and the plurality of the first switches are respectively electrically connected to the plurality of source signal output terminals;

wherein the first switching control line turns on or off the first switch to control a plurality of odd column signal output terminals of the odd column source signal output terminal group to provide or disconnect the source signal respectively to sub-pixels in the odd column pixel unit, and to control a plurality of even column signal output terminals of the even column source signal output terminal group to provide or disconnect the source signal respectively to sub-pixels in the odd column pixel unit.

3. The display device of claim 2, wherein the switching module further comprises:

a second switching control line, electrically connected to the switching controller, configured to provide a second switching control signal;

a plurality of second switches, wherein a first end of the second switch is electrically connected to the second switching control line, a second end of the second switch is electrically connected to one of the data lines, third ends of each two target second switches are electrically connected to a same source signal output terminal in the target source signal end group, and one of the source signal output terminals is connected to the third ends of only two of the second switches, and the two target second switches are the two second switch switches connected to two of the target data lines, respectively;

wherein the second switching control line turns on or off the second switch to control one of the source signal output terminals in the target source signal end group to simultaneously provide or disconnect the source signal to sub-pixels in a target odd column pixel unit and sub-pixels in a target even column pixel unit; the target source signal end group is the odd column source signal output terminal group or the even column source signal output terminal group; and the target odd column pixel unit and the target even column pixel unit are an odd column pixel unit and an even column pixel unit of the adjacent columns in the pixel unit array.

4. The display device of claim 3, wherein the first switch and the second switch are implemented with any one of or a combination of a thin-film transistor, a T-channel metal oxide semiconductor field effect transistor (MOSFET), a P-channel MOSFET, and a complementary MOSFET.

5. The display device of claim 1, further comprising:

a transistor unit, wherein each of transistor unit is electrically connected to one of the data lines, one of the scan lines and a pixel electrode of the sub-pixel, respectively and is configured to control the data signal to be inputted into the pixel electrode under a control of the scan signal.

6. The display device of claim 1 being a naked-eye three-dimensional display device.

7. A method for controlling a display device, applied to the display device, the display device comprising a plurality of source signal output terminals, a plurality of data lines, a plurality of scan lines, a plurality of sub-pixels and a switching module arranged in an array, the method comprising:

when the display device displays a three-dimensional picture, turning on the scan lines line by line, wherein each scan line is turned on for a set time period T; during a turning-on period, utilizing the switching module to control a source signal output terminal to be electrically connected with one of the data lines; wherein T is a positive integer; and when the display device displays a two-dimensional picture, turning on the scan lines two lines by two lines, wherein each scan line is turned on for a set time period 2T; during a turning-on period, utilizing the switching module to control a source signal output terminal to be electrically connected with two target data lines; and the target data lines are two data lines connected to two columns of sub-pixels with the same luminous color.

8. The method of claim 7, wherein the display device comprises a switching module that comprises a second switching control line and a plurality of second switches, and the step of utilizing the switching module to control a source signal output terminal to be electrically connected with one of the data lines when the display device displays a three-dimensional picture comprises:

when the display device displays a three-dimensional picture, utilizing the first switching control line to output a high voltage level to turn on the first switch and utilizing the second switching control line to output a low voltage level to turn off the second switch.

9. The method of claim 8, wherein when the display device displays a two-dimensional picture, the step of utilizing the switching module to control a source signal output terminal to be electrically connected with two target data lines comprises:

when the display device displays a two-dimensional picture, utilizing the first switching control line to output a low voltage level to turn off the first switch and utilizing the second switching control line to output a high voltage level to turn on the second switch.

10. A display equipment, comprising a display device, the display device comprising:

a plurality of source signal output terminals, electrically connected to a source driver, configured to transmit a data signal provided by the source driver;

a plurality of data lines, electrically connected to the plurality of source signal output terminal, configured to transmit the data signal;

a plurality of scan lines, electrically connected to a gate driver, configured to transmit a scan signal provided by the gate driver;

a pixel unit array, wherein each pixel unit includes a plurality of sub-pixels, a color resistance of sub-pixels in a same column is identical, a color resistance of sub-pixels of adjacent columns are different, sub-pixels of a same column are electrically connected with an identical data line, sub-pixels of a same row are electrically connected with an identical scan line, and an on-off status between the data line and pixel electrodes of the sub-pixels are controlled by the scan lines to control a luminance of the sub-pixels; and a switching module, electrically connecting the source signal output terminals and the data lines, configured to control the on-off status between the source signal output terminals and the data lines;

wherein when the display device displays a three-dimensional picture, the scan lines are turned on line by line, and each scan line is turned on for a set time period T; during a turning-on period, the switching module controls a source signal output terminal to be electrically connected with a data line, and T is a positive integer;

wherein when the display device displays a two-dimensional picture, the scan lines are turned on two lines by two lines, and each scan line is turned on for a set time period 2T; during a turning-on period, the switching module controls a source signal output terminal to be electrically connected with two target data lines; and the target data lines are two data lines connected to two columns of sub-pixels with the same luminous color.

11. The display equipment of claim 10, wherein the pixel unit array includes odd column pixel units and even column pixel units, the odd column pixel units and the even column pixel units are arranged sequentially along the scan line direction; the plurality of source signal output terminals comprise an odd column source signal output terminal group and an even column source signal output terminal group, and the odd column source signal output terminal group and the even column source signal output terminal group are arranged sequentially along the scan line direction; and the switching module comprises:

a first switching control line, electrically connected to a switching controller, configured to provide a first switching control signal; and a plurality of first switches, a first end of the first switch is electrically connected to a first switching control line, a second end of the first switch is electrically connected to one of the data lines, and the plurality of the first switches are respectively electrically connected to the plurality of source signal output terminals;

wherein the first switching control line turns on or off the first switch to control a plurality of odd column signal output terminals of the odd column source signal output terminal group to provide or disconnect the source signal respectively to sub-pixels in the odd column pixel unit, and to control a plurality of even column signal output terminals of the even column source signal output terminal group to provide or disconnect the source signal respectively to sub-pixels in the odd column pixel unit.

12. The display equipment of claim 11, wherein the switching module further comprises:

a second switching control line, electrically connected to the switching controller, configured to provide a second switching control signal;

a plurality of second switches, wherein a first end of the second switch is electrically connected to the second switching control line, a second end of the second switch is electrically connected to one of the data lines, third ends of each two target second switches are electrically connected to a same source signal output terminal in the target source signal end group, and one of the source signal output terminals is connected to the third ends of only two of the second switches, and the two target second switches are the two second switch switches connected to two of the target data lines, respectively;

wherein the second switching control line turns on or off the second switch to control one of the source signal output terminals in the target source signal end group to simultaneously provide or disconnect the source signal to sub-pixels in a target odd column pixel unit and sub-pixels in a target even column pixel unit; the target source signal end group is the odd column source signal output terminal group or the even column source signal output terminal group; and the target odd column pixel unit and the target even column pixel unit are an odd column pixel unit and an even column pixel unit of the adjacent columns in the pixel unit array.

13. The display equipment of claim 12, wherein the first switch and the second switch are implemented with any one of or a combination of a thin-film transistor, a T-channel metal oxide semiconductor field effect transistor (MOSFET), a P-channel MOSFET, and a complementary MOSFET.

14. The display equipment of claim 10, wherein the display device further comprises:

a transistor unit, wherein each of transistor unit is electrically connected to one of the data lines, one of the scan lines and a pixel electrode of the sub-pixel, respectively and is configured to control the data signal to be inputted into the pixel electrode under a control of the scan signal.

15. The display equipment of claim 10 wherein the display device is a naked-eye three-dimensional display device.

16. The display equipment of claim 12 wherein when the display device displays a three-dimensional image, the first switching control line outputs a high voltage level to turn on the first switch, and the second switching control line outputs a low voltage level to turn off the second switch.

17. The display equipment of claim 16 wherein when the display device displays a two-dimensional picture, the first switching control line outputs a low voltage level to turn off the first switch, and the second switching control line outputs a high voltage level to turn on the second switch.

18. The display equipment of claim 12 wherein the display device does not comprise a data selector.

* * * * *